United States Patent
Heeke

(10) Patent No.: US 8,387,764 B2
(45) Date of Patent: Mar. 5, 2013

(54) TORQUE CONVERTER WITH PISTON CENTERED IN CLUTCH PLATE

(75) Inventor: Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 740 days.

(21) Appl. No.: 12/220,843

(22) Filed: Jul. 29, 2008

(65) Prior Publication Data

US 2009/0038903 A1    Feb. 12, 2009

Related U.S. Application Data

(60) Provisional application No. 60/962,734, filed on Jul. 31, 2007.

(51) Int. Cl.
  *F16H 45/02*    (2006.01)
(52) U.S. Cl. .................................. 192/3.29; 192/85.23
(58) Field of Classification Search .............. 192/3.29, 192/3.3, 85.23
See application file for complete search history.

(56) References Cited

U.S. PATENT DOCUMENTS

| | | | | |
|---|---|---|---|---|
| 3,185,273 A | * | 5/1965 | Smirl | 192/3.3 |
| 5,361,880 A | * | 11/1994 | Bojas | 192/3.29 X |
| 5,699,887 A | * | 12/1997 | Kundermann | 192/3.3 X |
| 5,755,312 A | * | 5/1998 | Greaves et al. | 192/3.29 |
| 5,826,688 A | * | 10/1998 | Arhab et al. | 192/3.29 |
| 5,964,329 A | * | 10/1999 | Kawaguchi et al. | 192/3.3 |
| 6,102,174 A | * | 8/2000 | Sasse | 192/3.29 X |
| 6,244,401 B1 | * | 6/2001 | Maienschein et al. | 192/3.3 |
| 6,264,018 B1 | * | 7/2001 | Matsuoka et al. | 192/3.29 |
| 6,269,923 B1 | * | 8/2001 | Yamashita et al. | 192/3.29 |
| 6,332,516 B1 | * | 12/2001 | Arhab | 192/3.29 |
| 6,431,335 B1 | * | 8/2002 | Kundermann | 192/3.3 |
| 6,675,941 B1 | * | 1/2004 | Arhab et al. | 192/3.29 X |
| 6,799,665 B1 | * | 10/2004 | Sasse et al. | 192/3.3 X |
| 6,851,531 B2 | * | 2/2005 | Sasse | 192/3.29 |
| 7,011,196 B2 | | 3/2006 | Sudau | |
| 7,201,261 B2 | * | 4/2007 | Zuehl | 192/3.29 |
| 7,222,706 B2 | * | 5/2007 | Tomiyama | 192/3.29 |
| 7,513,346 B2 | * | 4/2009 | Degler et al. | 192/3.3 |
| 7,703,590 B2 | * | 4/2010 | Heck et al. | 192/3.29 X |
| 7,938,239 B2 | * | 5/2011 | Heck et al. | |
| 2001/0007383 A1 | * | 7/2001 | Schmid | 192/3.29 X |
| 2004/0216972 A1 | * | 11/2004 | Tomiyama | 192/3.29 |
| 2006/0124421 A1 | * | 6/2006 | Ackermann | 192/3.29 |
| 2007/0251788 A1 | * | 11/2007 | Heck et al. | 192/3.3 |
| 2008/0000745 A1 | * | 1/2008 | Swank et al. | 192/3.29 |
| 2009/0032351 A1 | * | 2/2009 | Uhler | 192/3.29 |
| 2009/0045023 A1 | * | 2/2009 | Uhler | 192/3.29 |
| 2009/0101462 A1 | * | 4/2009 | Arhab et al. | 192/3.29 |
| 2009/0127050 A1 | * | 5/2009 | Ari et al. | 192/3.29 |
| 2009/0283378 A1 | * | 11/2009 | Degler | 192/3.29 |
| 2010/0059324 A1 | * | 3/2010 | Biermann | 192/3.29 |
| 2010/0084238 A1 | * | 4/2010 | Mueller et al. | 192/3.29 |
| 2010/0096231 A1 | * | 4/2010 | Sueck et al. | 192/3.29 |
| 2010/0276243 A1 | * | 11/2010 | Arhab et al. | 192/3.29 |
| 2011/0005880 A1 | * | 1/2011 | Carrier et al. | 192/3.29 |
| 2011/0114433 A1 | * | 5/2011 | Hattori et al. | 192/3.29 |

OTHER PUBLICATIONS

Mechanical Engineering Design, 7th ed. New York, McGraw-Hill, 2004, p. 464. TJ230.S5 2004.*

* cited by examiner

*Primary Examiner* — Gregory Binda
*Assistant Examiner* — Matthieu Setliff
(74) *Attorney, Agent, or Firm* — Davidson, Davidson & Kappel, LLC

(57) ABSTRACT

A torque converter including a cover and a bridging clutch for selective connection to the cover, the bridging clutch including a clutch plate fixed to the cover and having an inner radial surface and having a piston having an outer radial surface opposite the inner radial surface. A method for assembling a torque converter is also provided.

20 Claims, 2 Drawing Sheets

TORQUE CONVERTER WITH PISTON CENTERED IN CLUTCH PLATE

Priority to U.S. Provisional Patent Application Ser. No. 60/962,734, filed Jul. 31, 2007, is claimed, the entire disclosure of which is hereby incorporated by reference herein.

The present invention relates generally to hydraulic torque converters, and more particularly to hydraulic torque converters having bridging clutches.

BACKGROUND OF THE INVENTION

U.S. Pat. No. 7,011,196, hereby incorporated by reference herein, describes a hydraulic torque converter with a bridging clutch.

In FIG. 1, a prior art torque converter 10 contains a cover 12, an impeller 14, a turbine 16, and a bridging clutch 18. Torque converter 10 is driven by an engine connected at hole 20. Cover 12 has a front cover 22 and a back cover 24, secured and sealed together, for example welded. Impeller 14 is rigidly attached to back cover 24. Turbine 16 is rigidly attached to a turbine hub 26 with, for example, rivets 28. Turbine hub 26 is non-rotatably attached to a shaft 30 with, for example, splines 32. Shaft 30 may be the input shaft of a transmission, for example.

Leaf springs have been known to connect the piston of bridging clutch 18 to a separate piece later welded to front cover 22. Alternately, the piston, which can be in the form of a plate, splines to front cover 22 which can cause a rattle or noise complaint. Another method is to attach the piston to front cover 22 with leaf springs, typically positioned radially outside of friction surfaces.

SUMMARY OF THE INVENTION

The present invention provides a torque converter comprising a cover; and a bridging clutch for selective connection to the cover, the bridging clutch including a clutch plate fixed to the cover and having an inner radial surface and having a piston having an outer radial surface opposite the inner radial surface.

The present invention also provides a method for assembling a torque converter comprising: providing a cover, connecting a clutch plate to the cover, the clutch plate having an inner radial surface, and pressing the piston into the inner radial surface.

The present invention advantageously can simplify the connection of the piston and clutch plate to the cover.

Figure 1:
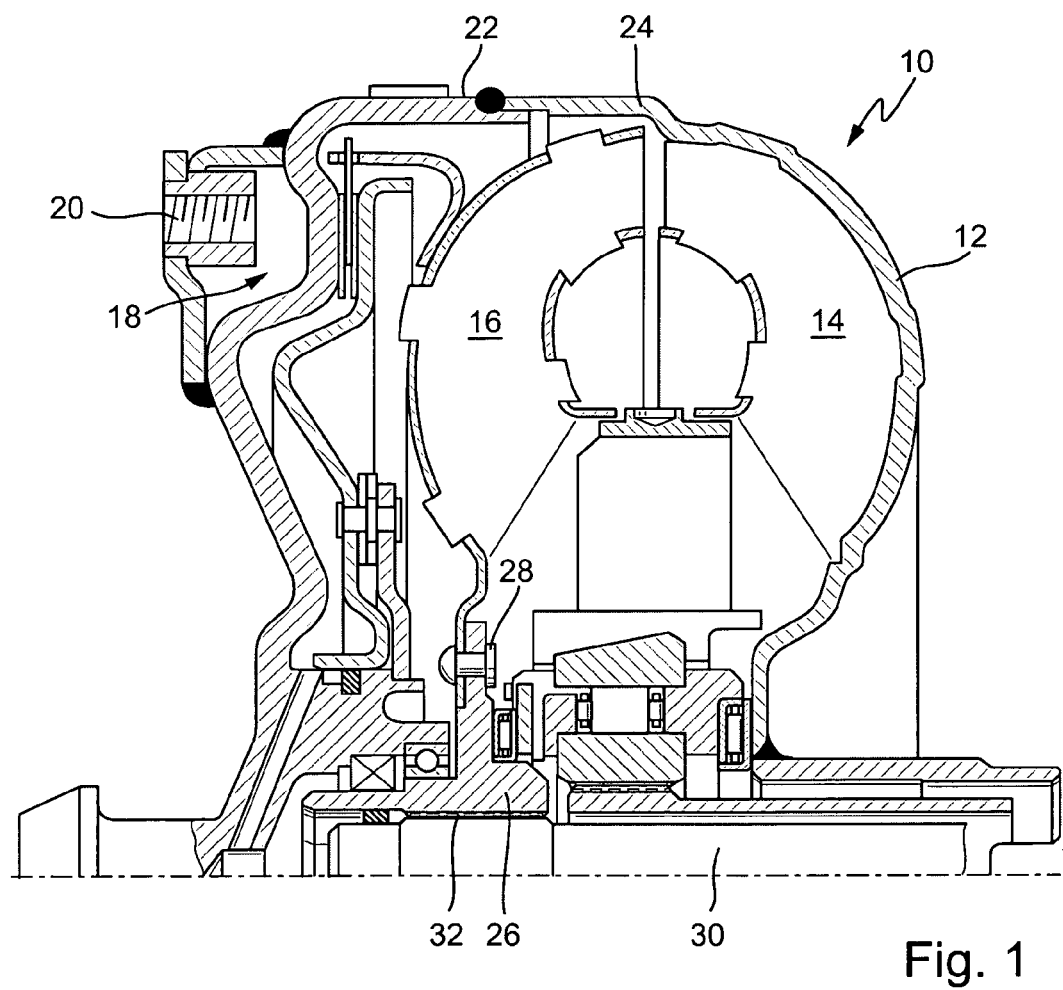
FIG. 1 shows a prior art torque converter.
Figure 2:
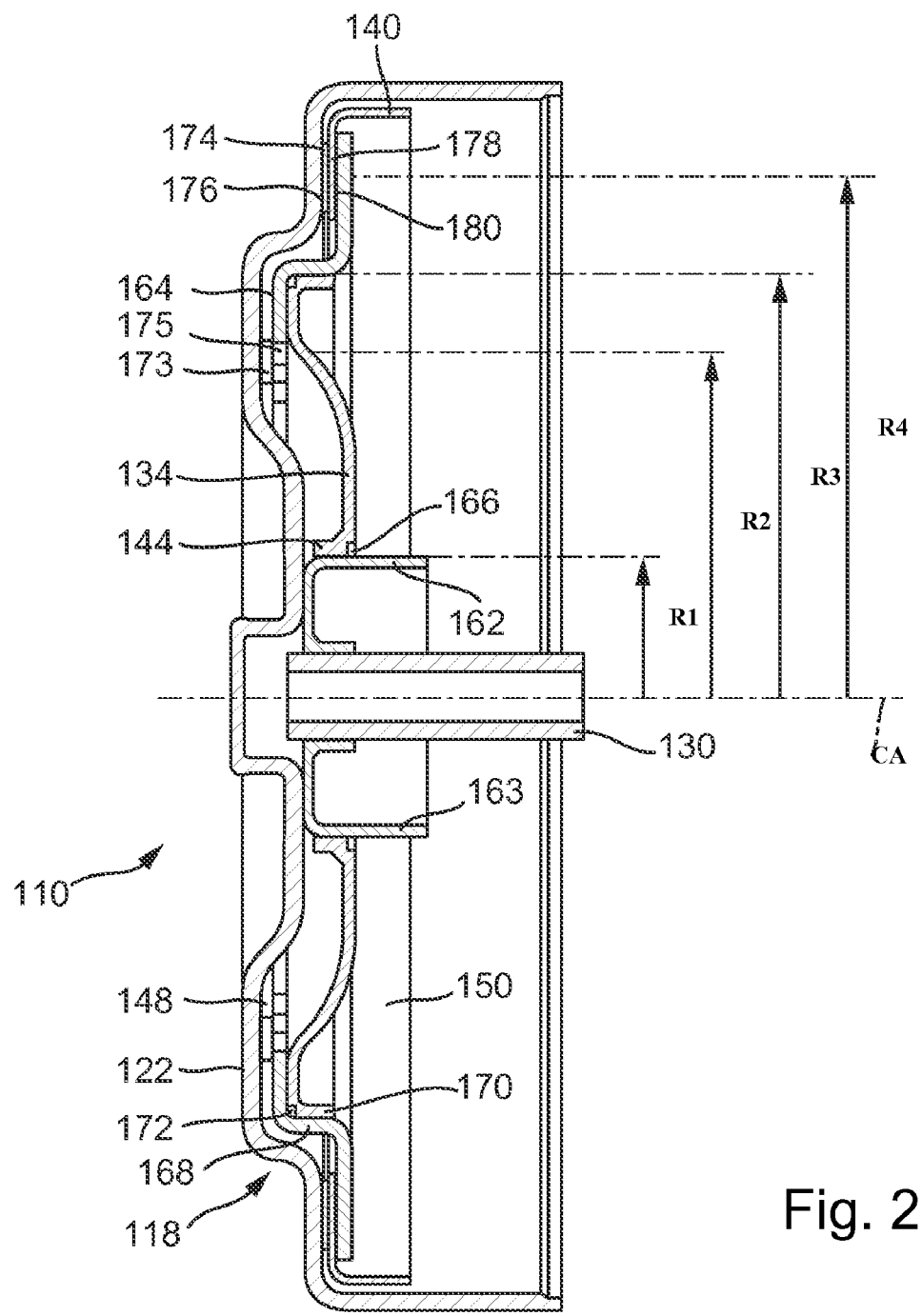

One embodiment of the present invention is shown with respect to the drawings in which:

FIG. 2 shows one embodiment of a torque converter according to the present invention.

DETAILED DESCRIPTION

FIG. 2 describes a torque converter 110 for connection to a shaft 130, which may be the input shaft of a transmission for example, according to the present invention. Torque converter 110 has a front cover 122, a bridging clutch 118, and a cover flange 162. An engine, attached to front cover 122, rotates front cover 122 about center axis CA. Torque from front cover 122 is transmitted in one mode hydraulically using an impeller and turbine to a turbine hub non-rotatably connected to shaft 130. Cover flange 162 is rigidly attached to front cover 122 and may be supported for example via a bearing on shaft 130 (shown schematically) located within cover flange 162.

Bridging clutch 118 includes a piston 134, a clutch plate 164, and a friction surface carrier 140. Cover 122 can have a friction surface 174, friction surface carrier 140 can have friction surfaces 176, 178 and clutch plate 164 can have a friction surface 180. In an assembly step, annular friction surface carrier 140 can be placed against cover 122, and then the pot-shaped clutch plate 164 can be attached to cover 122 with, for example, leaf springs 173. Clutch plate 164 can be riveted to cover 122, for example by rivets 175 through leaf springs 173. Clutch plate 164 has an axially-extending inner radial surface 170.

Piston 134 is an annular piston plate and has a base 144 supported by cover flange 162 and sealed with a seal 166. An axially-extending outer radial surface 168 of piston 134 is centered within surface 170 of clutch plate 164. The region between surfaces 168 and 170 is sealed with a seal 172. Because piston 134, cover flange 162, and clutch plate 164 have the same angular velocity, seals 166, 172 are rotationally static seals. By contrast, because cover flange 162 and shaft 130 do not necessarily have the same angular velocity, cover flange 162 seals to shaft 130 with a dynamic seal.

Piston 134 and clutch plate 164 can move axially within torque converter 110 according to a controlled pressure difference between regions 148 and 150. By sealing piston 134 and clutch plate 164 with seal 172, the area of clutch plate 164 as well as piston 134 becomes the effective area in applying the clutch.

Bridging clutch 118 can be engaged by introducing a higher pressure in region 150 than in region 148. This pressure difference moves piston 134 and clutch plate 164 axially towards cover 122 to compress springs 173 and engage friction surfaces 174, 176, 178, 180. Engagement of friction surfaces 174, 176, 178, 180 engages bridging clutch 118. When bridging clutch 118 is engaged, torque from the engine is transmitted by torque converter 110 to shaft 130 through a direct mechanical connection. By contrast, when bridging clutch 118 is not engaged, torque from the engine is transmitted by torque converter 110 to shaft 130 through hydraulic fluid using an impeller and a turbine.

Piston 134 advantageously can be assembled by pressing the piston within the already assembled pot-shaped clutch plate 164. No further connections in this embodiment are necessary.

Centering piston 134 between cover flange 162 and clutch plate 164 also avoids problems associated with using splines and welding. Assembly is simplified.

Rivets 175 are radially positioned between cover flange 162 and axially-extending surface 168. The radial locations of rivets 175, an axially-extending outer surface 163 of cover flange 162, and axially-extending surface 168 are R1, R2, and R3, respectively, in FIG. 2.

By positioning rivets 175 at location R3 radially inside friction surfaces 174, 176, 178, 180, the radial location R4 of friction surfaces 174, 176, 178, 180 can be maximized, thus advantageously maximizing friction surface area.

What is claimed is:

1. A torque converter comprising:
   a cover; and
   a bridging clutch for selective connection to the cover, the bridging clutch including friction surfaces, the bridging clutch including a clutch plate fixed to the cover and having an inner radial surface and having a piston having an outer radial surface opposite the inner radial surface, the inner radial surface centering the outer radial surface, the piston being axially moveable relative to the cover and the clutch plate being directly engageable with at least one of the friction surfaces of the bridging clutch, the cover being engageable with at least one of the friction surfaces of the bridging clutch, wherein the clutch plate is connected to the cover at a radial location inside the outer radial surface.

2. The torque converter as recited in claim 1 further comprising a cover flange fixed to the cover, and providing an axially extending surface opposite an inner radial surface of the piston, the piston extending radially between the cover flange and the clutch plate.

3. The torque converter as recited in claim 2 further comprising a stationary seal between the piston and the cover flange.

4. The torque converter as recited in claim 1 further comprising:
a stationary seal between the piston and the clutch plate.

5. The torque converter as recited in claim 4 further comprising leaf springs connecting the clutch plate to the cover.

6. The torque converter as recited in claim 1 further comprising a friction surface carrier positioned between the cover and the clutch plate.

7. The torque converter recited in claim 6 wherein a surface of the piston facing toward the cover forces the clutch plate against the friction surface carrier.

8. The torque converter recited in claim 6 wherein the friction surface carrier includes a first of the friction surfaces of the bridging clutch on a first side and a second of the friction surfaces of the bridging clutch on a second side, the clutch plate including a third friction surface directly engageable with the first friction surface, the cover including a fourth friction surface directly engageable with the second friction surface.

9. The torque converter as recited in claim 1 wherein the clutch plate is pot-shaped.

10. The torque converter as recited in claim 9 wherein the piston is an annular piston plate.

11. The torque converter recited in claim 1 wherein the piston includes a first surface facing towards the cover and the clutch plate includes a first surface facing towards the cover and a second surface facing away from the cover, the piston being axially movable such that a portion of the first surface of the piston is movable into contact with a portion of the second surface of the clutch plate so as to force a portion of the first surface of the clutch plate to contact the at least one of the friction surfaces.

12. The torque converter recited in claim 1 wherein the clutch plate is formed of one single plate.

13. The torque converter recited in claim 1 wherein the clutch plate is connected to the cover by a leaf spring, the piston overcoming a force of the leaf spring to cause a first surface of the clutch plate to directly engage with one of the friction surface of the bridging clutch.

14. The torque converter recited in claim 13 wherein the piston includes a first side facing the cover and a second side facing away from the cover, the piston overcoming a force of the leaf spring when a pressure on the second side exceeds the pressure on the first side.

15. A method for assembling a torque converter comprising:
providing a cover;
connecting a clutch plate to the cover with a leaf spring, the clutch plate having an inner radial surface;
pressing a piston into the inner radial surface such that the inner radial surface centers the piston, the piston being axially moveable relative to the cover; and
engaging the clutch plate directly with a friction surface of a bridging clutch by pressing the piston axially against the clutch plate and towards the cover.

16. The method as recited in claim 15 wherein the piston is an annular piston plate.

17. The method as recited in claim 15 wherein the connecting of the clutch plate to the cover includes riveting.

18. The method as recited in claim 15 wherein the piston includes a section at a same radial location as the connection between the clutch plate and the cover.

19. A torque converter comprising:
a cover; and
a bridging clutch for selective connection to the cover, the bridging clutch including friction surfaces, the bridging clutch including a clutch plate fixed to the cover and having an inner radial surface and having a piston having an outer radial surface opposite the inner radial surface, the piston being axially moveable relative to the cover and the clutch plate being directly engageable with at least one of the friction surfaces of the bridging clutch, the cover being engageable with at least one of the friction surfaces of the bridging clutch;
wherein the piston includes a first surface facing towards the cover and the clutch plate includes a first surface facing towards the cover and a second surface facing away from the cover, the piston being axially movable such that a portion of the first surface of the piston is movable into contact with a portion of the second surface of the clutch plate so as to force a portion of the first surface of the clutch plate to contact the at least one of the friction surfaces,
wherein the portion of the second surface of the clutch plate is radially inside of the portion of the first surface of the clutch plate.

20. A torque converter comprising:
a cover; and
a bridging clutch for selective connection to the cover, the bridging clutch including friction surfaces, the bridging clutch including a clutch plate fixed to the cover and having an inner radial surface and having a piston having an outer radial surface opposite the inner radial surface, the piston being axially moveable relative to the cover and the clutch plate being directly engageable with at least one of the friction surfaces of the bridging clutch, the cover being engageable with at least one of the friction surfaces of the bridging clutch;
a stationary seal between the piston and the clutch plate; and
leaf springs connecting the clutch plate to the cover.

* * * * *